US009042899B2

(12) United States Patent
Dalsgaard et al.

(10) Patent No.: US 9,042,899 B2
(45) Date of Patent: May 26, 2015

(54) CLOSED SUBSCRIBER GROUP MEASUREMENT REPORTING

(75) Inventors: Lars Dalsgaard, Oulu (FI); Benoist Pierre Sebire, Tokyo (JP); Jarkko Tuomo Koskela, Oulu (FI); Ivan Ore, Nummela (FI)

(73) Assignee: NOKIA CORPORATION, Espoo (FI)

( * ) Notice: Subject to any disclaimer, the term of this patent is extended or adjusted under 35 U.S.C. 154(b) by 205 days.

(21) Appl. No.: 12/681,338

(22) PCT Filed: Sep. 25, 2008

(86) PCT No.: PCT/IB2008/053923
§ 371 (c)(1),
(2), (4) Date: Jul. 22, 2010

(87) PCT Pub. No.: WO2009/044318
PCT Pub. Date: Apr. 9, 2009

(65) Prior Publication Data
US 2010/0298017 A1    Nov. 25, 2010

Related U.S. Application Data

(60) Provisional application No. 60/997,284, filed on Oct. 1, 2007.

(51) Int. Cl.
*H04W 36/00* (2009.01)
*H04J 11/00* (2006.01)
*H04W 8/26* (2009.01)

(52) U.S. Cl.
CPC ....... *H04W 36/0088* (2013.01); *H04J 11/0069* (2013.01); *H04W 8/26* (2013.01)

(58) Field of Classification Search
USPC ........ 455/422.1, 432.1–444, 446–457, 426.1, 455/426.2, 550.1, 552.1, 553.1, 556.1, 455/556.2, 560, 561; 370/310.2, 328, 338, 370/321, 322, 326, 329, 332, 337, 341, 345, 370/347
See application file for complete search history.

(56) References Cited

U.S. PATENT DOCUMENTS 6,434,389 B1 * 8/2002 Meskanen et al. ............ 455/437
6,529,491 B1   3/2003 Chang et al.
(Continued)

FOREIGN PATENT DOCUMENTS

| CN | 1678110 A | 10/2005 |
|---|---|---|
| CN | 1809214 A | 7/2006 |
| EP | 1675423 A1 | 6/2006 |

OTHER PUBLICATIONS

U.S. Appl. No. 60/955,503 by Fredrik Gunnarsson, Pal Fenger and Johan Moe filed Aug. 13, 2007, p. 1-6.*
(Continued)

*Primary Examiner* — San Htun
(74) *Attorney, Agent, or Firm* — Squire Patton Boggs (US) LLP

(57) ABSTRACT

An adjacent cell is determined to be a private cell, and then a measurement report of it that includes an identifier for the private cell is sent from a UE to the UE's serving network node. Methods, apparatus and computer readable media storing a program are detailed. In exemplary non-limiting embodiments: the identifier is at least a TA ID for the private cell's CSG network, where the UE receives the TA ID over a broadcast channel/system information of the serving network node; the TA ID may be a short TA ID received over a primary broadcast channel of the serving network node; the identifier comprises the TA ID and either a LI cell ID or a CSG cell ID; and if the UE is not a member of the CSG network it sends the measurement report only in response to a command received from the serving network node.

18 Claims, 2 Drawing Sheets

(56) References Cited

U.S. PATENT DOCUMENTS

| | | | |
|---|---|---|---|
| 2002/0032032 A1* | 3/2002 | Haumont et al. | 455/436 |
| 2006/0084443 A1 | 4/2006 | Yeo et al. | |
| 2007/0037577 A1 | 2/2007 | Dalsgaard et al. | |
| 2007/0171871 A1 | 7/2007 | Forsberg | |
| 2008/0085703 A1 | 4/2008 | Michaelsen et al. | |
| 2008/0102896 A1* | 5/2008 | Wang et al. | 455/560 |
| 2008/0132225 A1 | 6/2008 | Ranta et al. | |
| 2008/0207195 A1 | 8/2008 | Ranta et al. | |
| 2008/0220782 A1* | 9/2008 | Wang et al. | 455/436 |
| 2008/0280604 A1 | 11/2008 | Ore et al. | |
| 2009/0047968 A1* | 2/2009 | Gunnarsson et al. | 455/446 |
| 2011/0269460 A1 | 11/2011 | Dalsgaard et al. | |

OTHER PUBLICATIONS

International Search Report and Written Opinion of the International Searching Authority for PCT Application No. PCT/IB2008/053923, dated May 26, 2009, 9 pages.

3GPP TSG-RAN Working Group 4 (Radio) meeting #44 R4-071263 Athens, Greece, Aug. 20-24, 2007 Source: Ericsson, Title: System simulation results for Home NodeB interference scenario #2.

3GPP TSG-RAN WG4 Meeting #44, R4-0701494, Athens, Greece, Aug. 20-24, 2007, Source: Nortel, Title: Spectrum Arrangement to enable Co-channel deployment of Home NodeBs.

3GPP TSG RAN WG2 Meeting #59, R2-073374, Athens, Greece, Aug. 20-24, 2007, Source: NTT DoCoMo, Inc. Title: Cell ID Assignment for Home Node B.

3GPP TSG RAN2 Meeting #59, R2-073307, Athens, Greece, Aug. 2007, Samsung, "Measurement of Home and Private eNBs."

Vodafone Group, "Measurement Control in LTE-ACTIVE States", 3GPP TSG RAN WG2#58Bis, R2-072829, Jun. 25, 2007.

Ericsson, "UE Measurements and Reporting of Global Cell Identity" 3GPP Draft R2-072674, Jun. 19, 2007.

Panasonic, "System Information Content" 3GPP Draft, R2-071142, Mar. 21, 2007.

Vodafone Group, "Discussion of Mobility Requirements for Home-eNodeB", 3GPP Draft, R2-072071, May 2, 2007.

Dawes, "LS on Closed Subscriber Groups for LTE Home Cells", 3GPP TSG CT WG1 Meeting #48 C1-072156, Aug. 20, 2004.

Samsung Electronics, "E-UTRAN Identities for Inter-Node Mobility" 3GPP Draft, S2-070366, Jan. 9, 2007.

"3rd Generation Partnership Project; Technical Specification Group Radio Access Network; Evolved Universal Terrestrial Radio Access (E-UTRA) and Evolved Universal Terrestrial Radio Access Network (E-UTRAN);Overall description; Stage 2 (Release 8)", 3GPP TS 36.300, v8.1.0, Jun. 2007, pp. 1-104.

"Corrections to quantization requirements in E-TFC selection", 3GPP TSG-RAN2, Meeting #59, R2-073684, Release 7, v.7.5.0, Aug. 20-24, 2007, pp. 1-5.

"Handover and Cell Reselection Interruption time", 3GPP TSG RAN WG4 #44, R4-071451, RANWG4, Aug. 20-24, 2007, pp. 1-2.

International Preliminary Report on Patentability received for corresponding Patent Cooperation Treaty Application No. PCT/IB2008/053923, dated Apr. 7, 2010, 6 pages.

Office action received received in corresponding European Patent Application No. 08807814.2, dated Jun. 5, 2012, 5 pages.

International Search Report and Written Opinion received for corresponding Patent Cooperation Treaty Application No. PCT/IB2008/053922, dated May 26, 2009, 9 pages.

"Idle state access restriction for home eNB", 3GPP TSG-RAN WG2#59, R2-073415, Agenda: 8, Ericsson, Aug. 20-24, 2007, pp. 1-4.

International Preliminary Report on Patentability received for corresponding Patent Cooperation Treaty Application No. PCT/IB2008/053922, dated Apr. 7, 2010, 7 pages.

Office action received received in corresponding European Patent Application No. 08807813.4, dated Jun. 5, 2012, 4 pages.

Office action received for corresponding Chinese Patent Application No. 200880116193.X, dated Jul. 25, 2012, 13 pages of office action and 10 pages of office action translation.

Office action received for corresponding Chinese Patent Application No. 200880116193.X, dated Apr. 17, 2013, 5 pages of office action and 4 pages of office action translation.

Office Action received for corresponding Chinese Application No. 200880116193.X, dated Nov. 6, 2013, 5 pages Office action received for corresponding Chinese Patent Application No. 200880116193.X, dated May 4, 2014, 8 pages of Office Action, No English Language Translation available.

Nokia et al., "Access Control for CSG Cells", 3GPP TSG-RAN WG2, Meeting #58 bis, R2-072404, Agenda: 8, Jun. 25-29, 2007, 4 pages.

Office action received for corresponding Chinese Patent Application No. 200880116207.8, dated Jul. 13, 2012, 7 pages of office action and 4 pages of office action translation.

Idle State Access Restriction for Home eNB, 3GPP TSG-RAN WG3 Meeting #57, R3-071493, Ericsson, Aug. 20-24, 2007, 4 pages. "Idle State Access Restriction for Home eNB", 3GPP TSG-RAN WG3 #57, R3-071492, Agenda: 13.2.1, Ericsson, Aug. 20-24, 2007, 4 pages.

Idle State Access Restriction for Home eNB, 3GPP TSG-RAN WG3 Meeting #57, R3-071493, Ericsson, Aug. 20-24, 2007, 4 pages.

Non-Final Office action received for corresponding U.S. Appl. No. 12/681,304, dated Aug. 15, 2012, 23 pages.

* cited by examiner

CLOSED SUBSCRIBER GROUP MEASUREMENT REPORTING

RELATED APPLICATION

This application was originally filed as PCT Application No. PCT/IB2008/053923 on Sep. 25, 2008 and claims priority to U.S. Provisional Application No. 60/997,284 filed on Oct. 1, 2007, which is incorporated herein by reference in its entirety.

TECHNICAL FIELD

The exemplary and non-limiting embodiments of this invention relate generally to wireless communication systems, methods, devices and computer program products and, more specifically, relate to measurement reports of private network cells such as E-UTRAN home eNBs that are sent from a mobile terminal to the mobile terminal's serving network.

BACKGROUND

Following are some acronyms used in this description:
BCH broadcast channel
CSG closed subscriber group
eNB evolved NodeB (base station)
E-UTRAN evolved UTRAN (3.9 G or LTE)
GERAN GSM EDGE radio access network
GSM global system for mobile communications
LTE long term evolution
MME mobility management entity
OFDM orthogonal frequency division multiple access
P-BCH primary BCH
PLMN public land mobile network
SU-1 scheduling unit 1 (system information)
TA tracking area
UTRAN UMTS terrestrial radio access network (3 G)
UE user equipment
WLAN wireless local area network
WCDMA wideband code division multiple access Adjacent cell measurements are carried out in cell-based telecommunications systems. As known to those skilled in the art, the adjacent cell measurements are the basis for the handover and cell reselection decisions. The user equipment UE (mobile terminal), measures signal quality (such as signal strength, bit error rate BER, bit error probability BEP, or other signal quality parameters in use) from its serving cell and also from adjacent cells and reports these to the network in a measurement report. The measurement reports may be sent at regular intervals or in reply to a request/command from the network. The UE typically determines which cells are adjacent, and more narrowly which ones to measure, based on neighbor lists which in the prior art are delivered to the UEs on one or more control channels of the wireless system. The neighbor lists contain the necessary data about the adjacent cell so that the UE can find the neighbor cells easily and efficiently with reference to the list stored in its local memory.

In a large network with an extensive number of small cells, the process of determining the right or most appropriate neighbor to include in the neighbor lists that are used to configure the network is a substantial task. E-UTRAN (evolved universal mobile telecommunications system terrestrial radio access network, also known as 3.9G or long term evolution LTE) is developing to include more network cells than previous systems, including private networks (a single cell or group of cells) which E-UTRAN terms closed subscriber group CSG network cells with home eNBs (node B's or base stations). These are also known more generically as private networks, and are available for traffic (data and/or voice) only to those UEs specifically allowed access (e.g., registered as subscribers or guests) in the private network's subscriber group. Other wireless systems (GERAN, GSM, UTRAN, WCDMA, OFDM) are also proceeding in this general direction incrementally as more functionality is shifted from the radio network controller RNC to the base stations BSs. An individual private network may cover a relatively large geographic area with multiple cells (e.g., a corporate network or a large university campus), or may consist of a single home node B. Below, the term whitelist is used to refer to a list of private (CSG) cells for which a particular UE has access rights.

Relevant to these teachings is U.S. Provisional patent application No. 60/850,108, filed on Oct. 6, 2006 (now U.S. patent application Ser. No. 11/973,030 and International Patent Application No. PCT/IB07/02955 each of which was filed 4 Oct. 2007), describes that the UEs determine individually to limit their measurement reports based on certain criteria. U.S. Provisional patent application No. 60/881,287, filed on Jan. 18, 2007 (now U.S. patent application Ser. No. 12/009,399 and International Patent Application No. PCT/IB08/00104 filed respectively on 18 and 17 Jan. 2008), describes the network making decisions concerning the UE-generated measurement reports, which enables restricted requests for the mobile terminal to measure and report.

The closed subscriber group concept has been introduced is being standardized in E-UTRAN in 3GPP TS 36.300; Overall Description; Stage 2 (V8.1.0). CSG refers to a group of users which are given the rights to access a CSG cell. In other words, a CSG cell can only be accessed by UEs which belong to the CSG associated to that cell. These teachings relate to the UE measurement reporting aspects of the CSG concept.

The CSG layer refers to the layer formed by the CSG cells, and macro layer refers to the layer formed by the non-CSG cells (i.e. regular cells for which no CSG is defined). A CSG subnet refers to cells with continuous coverage associated to the same CSG.

Due to the large possible number of CSG cells under the coverage area of a macro (non-CSG) cell, and unlike with measurement reporting of non-CSG cells, measurement reporting of CSG cells cannot rely on physical layer identities identified by the primary and secondary synchronization channels P-SCH and S-SCH for unique identification of the target. Thus the UE's measurement report concerning CSG cells needs to include additional information for the network to uniquely identify the reported CSG cells.

Specifically, the network would need possibly to know:
CSG TA (eNodeB is aware of the whitelist TA, provided by the MME and should be part of the context transfer).
Identity of the cell in that TA
Other parameters such as measurement quantity are also needed. If one wants to be able to include non-allowed CSG cells into the measurement report, there is additionally a need for a CSG-group match indicator.
This leads to several questions.
A) What Information to Include in a Measurement Report:
UEs without a CSG subscription would possibly be able to use a less complex measurement report. An open question is whether the UE without a CSG subscription should be allowed to skip any measurements on CSG cells, or should they also be able to report them. It is anticipated that there will be a strong demand from operators to also allow UEs without a CSG subscription to report CSG cells (e.g. for self optimising network purposes).

B) How to Uniquely Identify Cells (Who is Responsible—UE OR ENB):

Parameters are needed in order to uniquely identify a cell are listed above. As the TA itself is rather large and the TA whitelist is delivered by the network, it makes sense to use an indexing system when reporting instead of including the actual TA. If this is chosen it will naturally limit the UE without a CSG subscription to report CSG cells (and a similar restriction for CSG subscribers: only cells with TA included in the list can be reported) unless some other approach is taken.

C) Reporting for Self-Configuration:

UEs should be able to report CSG cells that are not included as part of its subscription. Based on this information it is useful for the operators to detect interferers and reallocate the physical cell identifier (PHY cell ID) of the CSG cells. This kind of reporting is not the default reporting though and should be restricted to optimization campaigns.

In summary, several problems have been identified:
What to report to identify a target CSG cell;
Inclusion of allowed/restricted CSG cells into measurement report;
Reporting of allowed CSG cells; and
Whether one measurement report format is suitable for all purposes or multiple formats are required.

Several of these issues were addressed as the 3GPP TSG RAN WG2 meeting #59 held on Aug. 20-24, 2007 in Athens Greece, as detailed at documents R2-073307, R2-073684, R2-073374, R4-071263, R4-071451, and R4-0701494 (attached to the priority application as respective appendices A-F). What is needed is a standardized approach to cell measurements when a UE is in range of a private network cell but is not a member of that private network.

SUMMARY

According to one exemplary embodiment of the invention there is a method that includes determining that an adjacent cell is a private cell; and sending, from a user equipment to a serving network node of the user equipment, a measurement report of the private cell that includes an identifier for the private cell.

According to another exemplary embodiment of the invention is a memory storing a program of machine-readable instructions, executable by a processor for performing actions directed to sending a measurement report. In this embodiment the actions include determining that an adjacent cell is a private cell; and sending, from a user equipment to a serving network node of the user equipment, a measurement report of the private cell that includes an identifier for the private cell.

According to a further exemplary embodiment of the invention there is an apparatus that includes a processor and a transmitter. The processor is configured to determine that an adjacent cell is a private cell. The transmitter is configured to send to a serving network node a measurement report of the private cell that includes an identifier for the private cell.

According to yet another exemplary embodiment of the invention is an apparatus that includes processing means (such as for example a digital processor) and sending means (such as for example a transmitter). The processing means is for determining that an adjacent cell is a private cell. The sending means is for sending to a serving network node a measurement report of the private cell that includes an identifier for the private cell.

According to a still further exemplary embodiment of the invention there is a method that includes broadcasting from a serving network node an identifier for an adjacent private cell, sending to a user equipment that is not a member of a closed subscriber group of the private cell a message to send a measurement report, and receiving from the user equipment in response to the message a measurement report of the private cell.

According to yet another exemplary embodiment of the invention there is an apparatus that includes a transmitter and a receiver. The transmitter is configured to broadcast an identifier for an adjacent private cell, and to send to a user equipment that is not a member of a closed subscriber group of the private cell a message to send a measurement report. The receiver is configured to receive from the user equipment in response to the message a measurement report of the private cell.

DETAILED DESCRIPTION

As stated above there remains a wide range of open issues or problems related to how to treat CSG cells in measurement reports, including how to identify those cells and what to report. Below are detailed multiple aspects targeted at finding solutions for the open issues/problems detailed above.

Figure 1:
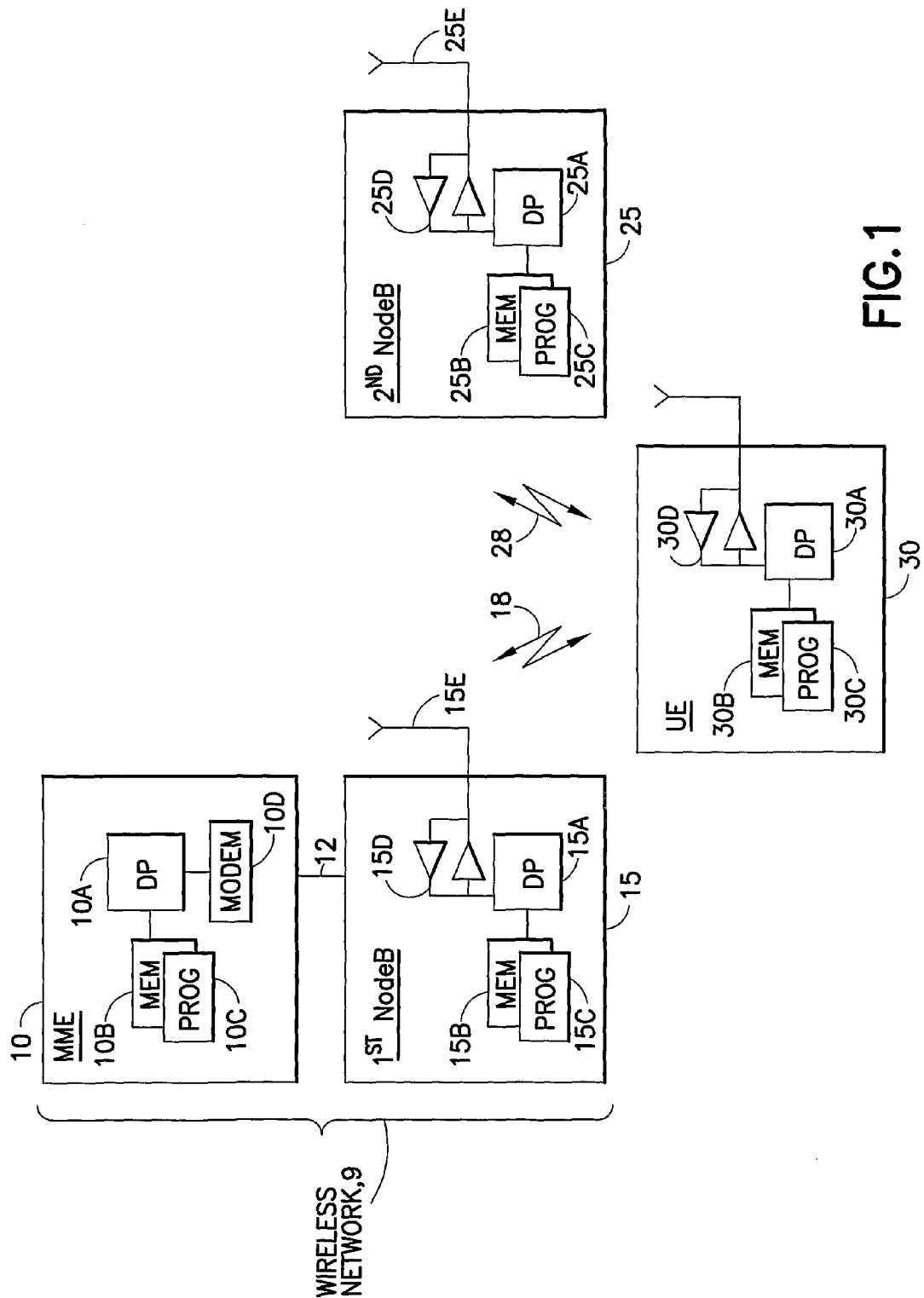
FIG. 1 is a high level block diagram of various devices used in carrying out various aspects of the invention.

Prior to detailing those particular embodiments, reference is made first to FIG. 1 for illustrating a simplified block diagram of various electronic devices that are suitable for use in practicing the exemplary embodiments of this invention. In the description of the invention below, the serving cell is represented in FIG. 1 as the first node B and the CSG cell is represented as the second node B. In FIG. 1 a first (non-CSG) wireless network 9 is adapted for communication with a UE 30 via a first NodeB 15 over a first wireless link 18, and also a second (CSG/private) wireless subnetwork is adapted for communication with the UE 30 via a second (home) NodeB 25 over a second wireless link 28. The wireless links 18, 28 are generally active only at different times. While the MME 10 is shown as controlling only one NodeB 15 in the first network 9, it is understood that it may control multiple NodeBs. The term MME represents by example a network element further removed from the UE 30 than the NodeB 15, and the MME 10 may be known alternately as a gateway, a radio network controller, or by other terms in different types of networks. The NodeB's may be eNBs or generic base stations. The MME 10 controls the first NodeB 15 through a first Iub interface 12. The Iub interface 12 may be wired or wireless, and relay nodes may also be present between either of the NodeBs and the UE, such as where either network is a mesh network with fixed and/or mobile relay nodes (not shown). The MME 10 is coupled to a core network CN (not shown, such as a mobile switching center MSC or a Serving GPRS Support Node SGSN) through an S-1 interface as known in the art (termed an Iub interface in some other systems).

The MME 10 includes a data processor (DP) 10A, a memory (MEM) 10B that stores a program (PROG) 10C, and a modem 10D for modulating and demodulating messages sent and received over the various bidirectional interfaces. Similarly, each of the NodeBs 15 & 25 include a DP 15A &

25A and a MEM 15B & 25B that stores a PROG 15C & 25C. The NodeB's 15 & 25 each also include a modem for communicating with their respective RNC 10 over the Iub 12, but in FIG. 1 is shown only a suitable radiofrequency RF transceiver 15D & 25D for wireless bidirectional communication at a suitable RF using one or more antennas 15E, 25E (one shown for each), such as with the UE 30 over the links 18 & 28. The UE 30 also includes a DP 30A, a MEM 30B for storing a PROG 30C, and a wireless transceiver 30D. At least the PROGs 10C & 20C, and in some embodiments also 15C, 25C and/or 30C, are assumed to include program instructions that, when executed by the associated DP, enable the electronic device to operate in accordance with the exemplary embodiments of this invention, as will be discussed below in greater detail.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

Certain of the exemplary embodiments of this invention may be implemented at least in part by computer software executable by the DP 30A of the UE 30 and by the DP 15A of the first node B 15 (as well as the DPs 25A, 10A of the second node B 15 and MME 10 as may be appropriate in different embodiments), or by hardware, or by a combination of software and hardware.

The various embodiments of the UE 30 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 15B, 25B and 30B may be of any type suitable to the local technical environment and may be implemented using any suitable data storage technology, such as semiconductor-based memory devices, magnetic memory devices and systems, optical memory devices and systems, fixed memory and removable memory. The DPs 10A, 15A, 25A and 30A may be of any type suitable to the local technical environment, and may include one or more of general purpose computers, special purpose computers, microprocessors, digital signal processors (DSPs) and processors based on a multi-core processor architecture, as non-limiting examples.

It is anticipated that at least some aspects of this invention are appropriate to be written into a wireless network protocol or standard. Embodiments of the invention can reside wholly in software.

Now are described the exemplary embodiments of the invention with particularity. First, what needs to be reported in order to identify a target CSG cell? To identify a target CSG subnet to which the CSG cell belongs to, the UE should at least report the CSG TA (available in SU-1 of the neighboring cell) together with the measurement report of that CSG cell. If a short CSG TA is also available on the P-BCH of the neighboring cell as is proposed by the inventors at U.S. Provisional patent application No. 60/997,275 (filed Oct. 1, 2007 and attached to the priority application as Exhibit G), there is no need for the UE to decode SU-1 and so only the short CSG TA from the P-BCH could be reported together with the measurement report of that cell. When the short CSG TA is known to be available, then according to an embodiment of the invention the serving cell decides whether the CSG TA or short CSG TA needs to be reported (i.e. and decoded) by the UE. Additionally, to identify the target CSG cell within the CSG subnet, it is proposed that the UE reports either the L1 cell ID and/or the CSG cell ID broadcast on SU-1/P-BCH.

Next is considered whether to include in the measurement report from a particular UE the CSG cells that are restricted as to that particular UE. It is proposed herein that the basic/normal/default behavior for the UE sending measurement reports is that UEs which do not belong to any CSG are not required to report those CSG cells to which they do not have access (in whose CSGs they don't belong). However, there is provided an option for the network to command that a non-member UE provide measurement reports on a CSG cell for which the UE is not a member (or guest or otherwise allowed access). Therefore in an embodiment reporting of CSG cells by UEs which do not belong to any CSG cell is only done when required by the serving cell. The UE will use normal macro cell measurement reporting for this purpose (i.e. the UE would be using the measurement reporting rules as applied by UEs which belong to the CSG cell for measurement reporting of those CSG cells).

Next is considered measurement reporting for CSG cells in which the UE is a member. There may be a need for the network to know whether the UE has access to the CSG cell it reports. This can either be done by limiting the measurement reports of CSG cells to UEs which have access to those CSG cells (except where the network explicitly commands otherwise as above), or by adding a one bit indicator in the UE's measurement report for those cells. The latter option allows the reporting of cells to which the UE has no access. The one bit indicator indicates whether there is a match between the cell's CSG TA and an entry in the UE's whitelist of CSG cells for which it has access. The match could depend on whether the full CSG TA or the short CSG TA is used in the reporting.

Next is considered the issue of whether one or more than one measurement report formats would best support the above solutions. Two reporting methods can be created to differentiate CSG cells that the UE can access from the CSG cells to which it has no access. One report (first measurement report format) is used for measurement reporting of CSG cells to which the UE has access rights. UEs will use this measurement report for reporting cells according to and in line with its CSG subscription rights (i.e. whitelist content). UEs with no CSG subscription (or without a valid CSG subscription/whitelist) will not include CSG cells into this report.

For reporting of CSG cells by UEs without a CSG subscription or without a valid whitelist, another measurement report format will be used, the second measurement report format. This report will also be used by UE with valid whitelist or CSG subscription for reporting CSG cells with access restrictions.

To enable the above aspects, certain control bits are now detailed for the different options. For the control of the identity to be reported, this can be realized by introducing a new 1-bit field. Whether it should be mandatory to include L1 cell IDs into the report could also be indicated. If network cannot get additional identification information from the L1 cell ID, it could choose to indicate that this identity need not be included for CSG cells. Also this can be realized by introducing a 1-bit field.

For indicating whether or not a reported CSG cell is accessible by the UE, another new 1-bit field is introduced.

For the measurement reporting UE could just identify cells by indexing the whitelist (list of registered CSGs).

So in view of the above, the following advantages may be realized by embodiments of this invention. For how to identify a target CGS cell in a measurement report, it is possible to use shorter identity of CSG cells (SHORT TA ID) thereby reducing the signalling overhead. Alternatively the UE could just report an index to the whitelist (list of registered CSGs). It is also possible to just report the L1 Cell ID if the network has knowledge of which L1 Cell IDs are allocated to the cells to which the UE has been registered. The benefit of this approach is that same measurement reporting can be used as is used for the macro cells. Another advantage is that by allowing the network to indicate to the UE whether full CSG TA (from SU-1) or the shorter CSG TA (from P-BCH) is to be reported, the signaling overhead caused by introducing the TA into the measurement report might be reduced (significantly). So by a simple indication it is possible to reduce the signalling overhead in measurement reports by allowing the UE to perform and indicate the full TA match in its measurement report. By this feature it is not necessary to send the full CSG TA over the air interface while still having similar cell identity precision. Further, it is possible for the network to activate reporting of CSG cells also from UE with no CSG subscription to that cell. This means that it is possible to disable the reporting from some UEs as well. The reporting of non-allowed CSG cells helps the network operator to identify potential CSG cell interferers. However, it is less than ideal to have two different measurement report formats.

The above measurement reporting embodiments can be made mandatory in a wireless specification so that both the eNodeBs and the UEs are aware in advance of the formats and contents of the measurement reports.

Figure 2:
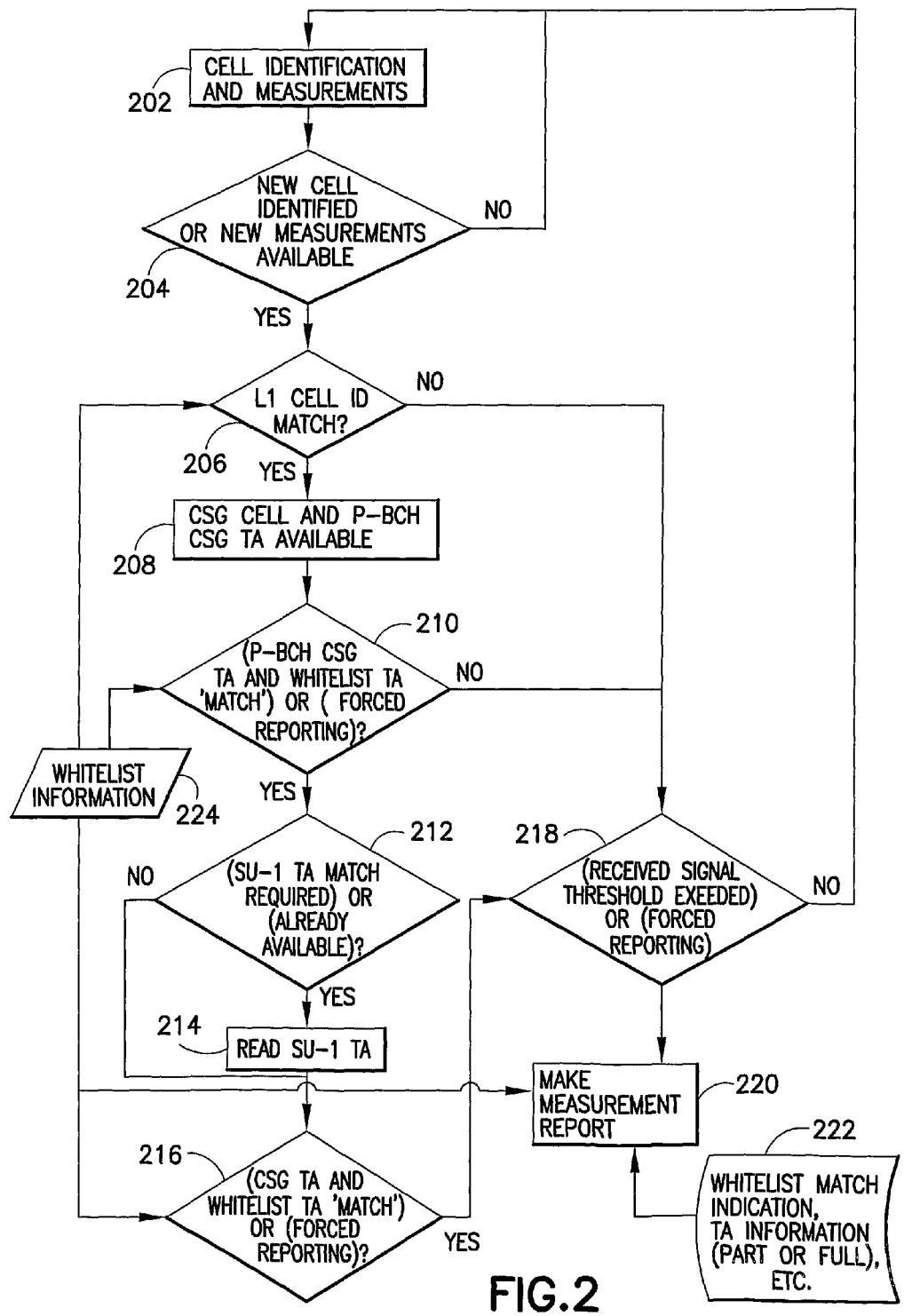
FIG. 2 is a process flow diagram that illustrates a particular embodiment of the invention.

An embodiment of the above aspects is shown in FIG. 2. At block 202 the UE takes measurements for a measurement report and reads the cell ID from which it takes the measurements and sends that measurement report as normal. At block 204 the UE identifies a new cell and takes measurements for a potential report to be sent. If there is no new cell then the UE continues back to block 202 making its regular measurement reports. At block 206 the UE sees that the new ID from block 204 matches a layer 1 cell ID against the whitelist stored in memory at block 224. Recall that if there are multiple CSG cells, the layer 1 ID will not alone identify that CSG cell to the network in the measurement report. If the layer 1 ID is found, then at block 208 the UE listens to the P-BCH of the CSG cell to get the CSG TA of the CSG cell. If at block 210 there is a match between the (short) CSG TA received in the P-BCH and the whitelist stored in the UE's memory at block 224, then for the case where the UE is instructed to report the long CSG ID the flow proceeds to block 212 where the UE checks for a match of the long CSG ID broadcast as system information on SU-1. Alternatively, in an embodiment the short CSG TA is not used and blocks 208-210 are skipped, so that in FIG. 2 the flow would go from the L1 cell ID match at block 206 to the UE reading the SU-1 TA at block 214 for the full CSG TA and matching at block 216 the full CSG TA from SU-1. If the long CSG is available, the UE reads it (or the remainder of the CSG TA apart from the short CSG TA on the P-BCH if that option is used) at 214 and matches to the whitelist of block 224, and if a match is found and the reporting threshold (e.g., signal strength) is exceeded at block 218, then the UE sends the measurement report at 220. If at block 206 there is no L1 cell ID match, or at block 210 there is no short CSG TA match, then for the case where the network commands specifically the UE to make the measurement report (forced reporting at block 218), that forced measurement report is also sent 220.

Based on the foregoing it should be apparent that the exemplary embodiments of this invention provide a method, apparatus and computer program product(s) for a UE to determine whether or not it has access rights to a private cell. For the case where the UE does have access rights to the private cell, the UE sends a measurement report of the private cell to its serving network node if the UE is able to sufficiently identify the private cell by either of a short tracking area identifier combined with a layer 1 identifier or a long tracking area identifier. In that case the measurement report includes the short tracking number and layer 1 identifier or the long tracking area identifier as appropriate. For the case where the UE does not have access rights to the private cell, the UE sends a measurement report of the private cell to its serving network node only in the case where the serving cell specifically requests it.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block and signaling diagrams, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
   determining that an adjacent cell is a private cell; and
   sending, from a user equipment to a serving network node of the user equipment, a measurement report of the private cell that includes an identifier for the private cell,
   wherein the measurement report further comprises a one bit indicator indicating whether there is a match between the identifier for the private cell and an entry in a whitelist of private cells for which the user equipment has access so that the user equipment is a member of a closed subscriber group that has access rights to the private cell, and
   wherein determining that the adjacent cell is a private cell further comprises determining that the user equipment is a member of the closed subscriber group by reference to a whitelist stored locally in the user equipment, wherein the whitelist comprises closed subscriber group networks to which the user equipment is allowed access.

2. The method of claim 1, wherein the identifier for the private cell comprises at least a tracking area identifier for a closed subscriber group network of which the private cell is a member, wherein the user equipment receives the tracking area identifier over a broadcast channel of the serving network node.

3. The method of claim 2, wherein the tracking area identifier is received by the user equipment in system information broadcast from the serving network node.

4. The method of claim 2, wherein the tracking area identifier comprises a short tracking area identifier received by the user equipment over a primary broadcast channel of the serving network node.

5. The method of claim 2, wherein the identifier for the private cell comprises the tracking area identifier and one of a layer 1 cell identifier or a closed subscriber group cell identifier that identifies the private cell within the closed subscriber group network that is identified by the tracking area identifier.

6. The method of claim 1, wherein for the case where the user equipment is not a member of a closed subscriber group network, the user equipment sends the measurement report only in response to a command received from the serving network node.

7. The method of claim 1, wherein for the case where the user equipment is a member of a closed subscriber group network, the user equipment sends measurement reports of the private cell at regular intervals so long as a reporting threshold is met.

8. The method of claim 1, wherein:
   determining that the user equipment is a member of the closed subscriber group by reference to the whitelist comprises comparing a first identifier, received by the user equipment on a broadcast channel, against entries in the whitelist; and
   the identifier for the private cell that is sent with the measurement report comprises an index to the whitelist.

9. An apparatus comprising:
   a processor configured to determine that an adjacent cell is a private cell; and a transmitter configured to send to a serving network node a measurement report of the private cell that includes an identifier for the private cell,
   wherein the measurement report further comprises a one bit indicator indicating whether there is a match between the identifier for the private cell and an entry in a whitelist of private cells for which the user equipment has access so that the user equipment is a member of a closed subscriber group that has access rights to the private cell, and
   wherein the processor configured to determine that the adjacent cell is a private cell further comprises the processor being configured to determine that the user equipment is a member of the closed subscriber group by reference to a whitelist stored locally in the user equipment, wherein the whitelist comprises closed subscriber group networks to which the user equipment is allowed access.

10. The apparatus of claim 9, wherein the identifier for the private cell comprises at least a tracking area identifier for a closed subscriber group network of which the private cell is a member, wherein the apparatus further comprises a receiver configured to receive the tracking area identifier over a broadcast channel of the serving network node.

11. The apparatus of claim 10, wherein receiver is configured to receive the tracking area identifier in system information that is broadcast from the serving network node.

12. The apparatus of claim 10, wherein the tracking area identifier comprises a short tracking area identifier which the receiver is configured to receive over a primary broadcast channel of the serving network node.

13. The apparatus of claim 10 wherein the identifier for the private cell comprises the tracking area identifier and one of a layer 1 cell identifier or a closed subscriber group cell identifier that identifies the private cell within the closed subscriber group network that is identified by the tracking area identifier.

14. An apparatus comprising:
    a transmitter configured to broadcast an identifier for an adjacent private cell, and to send to a user equipment a message to send a measurement report; and
    a receiver configured to receive from the user equipment in response to the message a measurement report of the private cell that includes the identifier for the private cell,
    wherein the measurement report further comprises a one bit indicator indicating whether there is a match between the identifier for the private cell and an entry in a whitelist of private cells for which the user equipment has access so that the user equipment is a member of a closed subscriber group that has access rights to the private cell, and
    wherein the member of the closed subscriber group is determined in the user equipment by reference to a whitelist stored locally in the user equipment, wherein the whitelist comprises closed subscriber group networks to which the user equipment is allowed access.

15. The apparatus of claim 14, wherein the identifier for the private cell comprises at least a tracking area identifier for a closed subscriber group network of which the private cell is a member.

16. The apparatus of claim 15, wherein the identifier for the private cell comprises the tracking area identifier which identifies the closed subscriber group network and one of a layer 1 cell identifier or a closed subscriber group cell identifier that identifies the private cell within the closed subscriber group network.

17. The method claim 15, wherein the transmitter is configured to transmit the tracking area identifier in system information.

18. The apparatus of claim 15, wherein the tracking area identifier comprises a short tracking area identifier which the transmitter is configured to transmit over a primary broadcast channel.

* * * * *